United States Patent
Kim et al.

(10) Patent No.: US 6,888,975 B2
(45) Date of Patent: May 3, 2005

(54) MULTI-DIMENSIONAL OPTICAL CROSS-CONNECT SWITCHING SYSTEM

(75) Inventors: Byoung-Whi Kim, Kyungki-do (KR); Kwangjoon Kim, Daejon (KR); Seong-Soon Joo, Daejon (KR); Hae Geun Kim, Daejon (KR); Jong Hyun Lee, Daejon (KR)

(73) Assignee: Electronics and Telecommunications Research Institute (KR)

(*) Notice: Subject to any disclaimer, the term of this patent is extended or adjusted under 35 U.S.C. 154(b) by 278 days.

(21) Appl. No.: 10/205,107

(22) Filed: Jul. 24, 2002

(65) Prior Publication Data

US 2003/0118275 A1 Jun. 26, 2003

(30) Foreign Application Priority Data

Dec. 13, 2001 (KR) ........................................ 2001-78869

(51) Int. Cl.[7] ................................................ G02B 6/26
(52) U.S. Cl. ............................. 385/16; 385/24; 398/50; 398/56
(58) Field of Search ........................ 385/16, 24; 398/45, 398/50, 56

(56) References Cited

U.S. PATENT DOCUMENTS 6,690,848 B2 * 2/2004 Graves et al. ................. 385/16
2002/0044319 A1 * 4/2002 Kashima ..................... 359/128
2003/0002776 A1 * 1/2003 Graves et al. ................. 385/16
2003/0170025 A1 * 9/2003 Bortolini et al. ............. 398/50
2003/0185565 A1 * 10/2003 Wang et al. .................. 398/49

FOREIGN PATENT DOCUMENTS

EP    1 076 469    2/2001

OTHER PUBLICATIONS

Multi-granularity Optical Cross-Connect by L. Noirie et al. pp. 269–270.

* cited by examiner

Primary Examiner—Rodney Bovernick
Assistant Examiner—Sung Pak
(74) Attorney, Agent, or Firm—Blakely Sokoloff Taylor & Zafman

(57) ABSTRACT

A multi-dimensional optical cross-connect switching system. The system is capable of multi-dimensionally using wavelength resources, such as in the forms of optical fibers, optical wavelength bands and optical wavelengths. The system can three-dimensionally use the wavelength resources by being matched with an optical transport network through the optical fiber layer, optical wavelength band layer and optical wavelength layer. In addition, the multi-dimentional optical cross-connect switching system is constructed in such a way that two cross-connect switches are symmetrically arranged and an insertion/extraction switch is added to switch addition/dropping links between the two switches.

13 Claims, 17 Drawing Sheets

(a)

(b)

MULTI-DIMENSIONAL OPTICAL CROSS-CONNECT SWITCHING SYSTEM

BACKGROUND OF THE INVENTION

1. Field of the Invention

The present invention relates generally to an optical cross-connect switching system applied to an optical transport network, and more particularly to a multi-dimensional optical cross-connect switching system that is capable of multi-dimensionally using wavelength resources, such as in the forms of optical fibers, optical wavelength bands and optical wavelengths.

2. Description of the Prior Art

An optical fiber telecommunication network can transmit a large amount of information at a high speed so that the network is highlighted as a method of dealing with rapidly increasing Internet traffic. For example, a transmission of several tens of Giga bits can be achieved by the optical fiber telecommunication network.

In this optical fiber telecommunication network, a wavelength division multiplexing (WDM) has been employed as a very effective method in transmitting a plurality of optical signals having different wavelengths via a single optical fiber, thereby effectively using the wide bandwidth provided by the optical fiber.

Generally, the optical fiber telecommunication network consists of switching systems for performing optical cross-connect switching at intermediate nodes and optical fibers for connecting the switching systems to one another. It is largely required that those switching systems should be provisioned with routing capability to local networks connected to intermediate nodes in the optical transport network, so switching systems capable of carrying out optical cross connect operations are employed as the switching systems. The present invention relates to these optical cross-connect switching systems.

Hereinafter, a conventional optical cross-connect switching system will be described with reference to the accompanying drawings.

In FIG. 1, a general optical cross-connect switching system is shown.

Referring to the FIG. 1, the general optical cross-connect switching system comprises an optical switch module 13 having a switching capacity of (Nm+k)×(Nm+k), N amplifiers 11-1 to 11-N connected to N input optical fibers, respectively, N demultiplexers 12-1 to 12-N connected to the N amplifiers 11-1 to 11-N and the optical switch module 13, respectively, N amplifiers 15-1 to 15-N connected to N output optical fibers, respectively, and N multiplexers 14-1 to 14-N connected to the N amplifiers 15-1 to 15-N and the optical switch module 13, respectively. A transmission unit 16 of a local network (not shown) is connected to the optical switch module 13 through k optical links, while a reception unit 17 of the local network is connected to the optical switch module 13 through k optical links.

In the general optical cross-connect switching system constructed as described above, signals multiplexed through the input optical fibers are transmitted. These signals are amplified by amplifiers, and then split into m wavelengths by the demultiplexers 12-1 to 12-N. Accordingly, a total of N×m wavelengths are inputted to the optical switch module 13. Meanwhile, in order to transmit signals from a local network to another optical cross-connect switching system in the optical transport network or from another optical cross-connect switching system to the local network, the local network is connected to the optical cross-connect switching system, to which the network belongs through the transmission unit 16 and the reception unit 17. In FIG. 1, k inserted wavelengths inputted through the transmission unit 16 of the local network are combined together and a total of Nm+k wavelengths are switched in the optical switch module 13. The switched signals are multiplexed by the m signals by the multiplexer 14-1 to 14-N, amplified by the amplifier 15-1 to 15-N, and then transmitted to the optical transport network through N output optical fibers. K inserted wavelengths of the switched signals are transmitted to the local network through the reception unit 17.

The general optical cross-connect switching system having such a structure can one-dimensionally use wavelength resources. When the number of inserted and extracted wavelengths, the numbers of the input/output optical fibers and the number of multiplexed wavelengths per optical link are changed, the system has the problem of being not able to adapt to the change without considerably changing its internal mechanical structure. Also the internal modification evoke concomitant changes in the neighbor nodes connected to the system through the network. That is, in the general optical cross-connect switching system, there is little scalability for the above-mentioned elements.

Next, with reference to FIG. 2, recently proposed an existing multi-granularity optical cross-connect switching system is described.

The multi-granularity optical cross-connect switching system shown in FIG. 2 was suggested to increase the capacity of an optical transport network while maintaining a complexity at an appropriate level. The switching system shown in FIG. 2 is disclosed in a thesis by Nairie and C. Blaizot entitled "Multi-Granularity Optical Cross connect" on ECOC200, Munich, page 269–270, September 2000.

Referring to FIG. 2, the multi-granularity optical cross-connect switching system consists of a Fiber Cross-Connect (FXC) switch 210, a Bandwidth Cross-Connect (BXC) switch 220, and a Wavelength Cross-Connect (WXC) switch 230.

The switches 210, 220 and 230 have space division switches 211, 221, 231 to perform cross-connect switching, respectively. Input optical fibers A and output fibers B are connected to only the FXC switch 210. The space division switch 211 performs cross-connect switching between the input optical fibers A and optical fibers from a local network or BXC switch 220, and the output optical fibers B and optical fibers toward the local network or BXC switch 220. Part of the input optical fibers is sent to a local network (not shown) as extraction fibers (extraction F), while part of the fibers is sent to the BXC switch 220.

In the BXC switch 220, the fiber-waveband conversion of inputted optical fibers is performed by demultiplexers 222 and 223. The converted wavebands are inputted to the space division switch 221. In the space division switch 221, part of the fibers is sent to the local network as an extraction band (extraction B) and part of the fibers is sent to the WXC switch 230. The space division switch 221 performs cross-connect switching between input wavebands and wavebands from the local network or WXC switch 230, and output wavebands and wavebands toward the local network or WXC switch 230. The output wavebands of the space division switch 221 undergo band-fiber conversion, and then are sent to the FXC switch 210.

In the WXC switch 230, the waveband-wavelength conversion of the wavebands from the BXC switch 220 is performed by the demultiplexers 232 and 233, and the obtained wavelengths are inputted to the space division switch 231. In addition, the space division switch 231 is provided with insertion wavelengths (insertion W) from the local network and provides extraction wavelengths (extraction W) to the local network. Output wavelengths from the space division switch 231 undergo a wavelength-band conversion through multiplexers 234 and 235, and the processed wavelengths are provided to the BXC switch 220. The space division switch 231 performs cross-connect switching between input/output wavelengths.

Although the above described switch system has a structure with a switching function according to multi-granularity, only the FXC switch that corresponds to the lowest layer is directly connected to the optical transport network so that the structure can be considered as basically a structure that one-dimensionally utilizes wavelength resources. Nevertheless, thanks to the switching function according to the multi-granularity, when traffic is aggregated by a waveband or by an optical fiber on the basis of WDM, switching can be performed on an aggregated unit basis without demultiplexing all the multiplexed waves. Accordingly, this structure is advantageous in that the space switching fabric of the optical cross-connect switching system can be simplified. That is, as the number of waves to be cross connected is increased, the optical cross-connect switching system is further simplified in proportion to the increased number of waves. However, wavelength resources included in the optical transport network are still used one-dimensionally so that the above structure does not contribute to such effectiveness of the network structure through the three-dimensional use of the wavelength resources as to be addressed shortly. In addition, the above structure does not satisfy the following preconditions that may be required for a three-dimensional use of the wavelength resources in order to form a more effective optical transport network in aspects of transmission of optical signals as well as topological simplicity.

The above-described preconditions may be summarized as follows:

First, the optical cross-connect switching system should have modularity so that the addition and subtraction of the FXC, BXC and WXC switching functions can be easily achieved, whenever needed, according to a position where the system is provisioned.

Second, the number of links, which are inserted or extracted at each layer of the FXC, BXC or WXC switch should be able to be easily rearranged.

Third, each layer of the FXC, BXC or WXC switch should be able to be independently connected to the optical transport network.

Fourth, the internal configuration change of the OXC switching system due to, e.g., number of insertion/extraction of links for interfacing local networks should not affect the optical transport network to which the corresponding OXC switching is connected.

Fifth, the OXC switching system should be easily adapted to the configuration change (that is, a change in the number of links connecting the network) of the network.

The structural disadvantages of the existing OXC switching systems have provided a motive for the present invention. In more detail, the insertion/extraction ports C1, C2 and C3/D1, D2 and D3 are physically fixed in FIG. 2, so the input/output ports of each space division switch should be manually changed when the ports are changed. Further, the number of the insertion/extraction ports and the number of the input/output ports A, B are mutually dependent, so the change of the extraction/insertion ports immediately affects the input/output ports, which in turn influence the network configuration. In more detail, the FXC, BXC and WXC switches are mutually and physically connected to one another, so there is difficulty in splitting or coupling and, upon splitting or coupling, the connection structure causes the change of related ports C and D, so the input/output ports or the network configuration are affected as mentioned above.

Meanwhile, for one of prior art optical cross-connect switching systems, "Optical wavelength space cross-connect switch architecture" has been registered as European Patent EP-1076469A2 on Feb. 14, 2001.

The switch architecture of the preceding patent is comprised of a plurality of Wavelength-Selection type optical Cross-Connect (WSXC) switch fabrics, which receive multi-wavelength input signals split by one or more wavelength splitters and produce wavelength-multiplexed output signals to be multiplexed by a plurality of optical couplers. The WSXC switch employs a Fiber Bragg Grating (FBG) as a wavelength selection element. By using this structure, the number of wavelength-multiplexed channels to be processed by each WSXC switch is reduced in comparison with the number of channels included in input signals that have been wavelength-multiplexed. In addition, a wavelength interval between adjacent channels to be processed by each WSXC switch becomes wider than an interval between adjacent channels in the wavelength-multiplexed input signals. Accordingly, the architecture of the prior patent can considerably reduce the number of wavelength-selective elements required to form an arbitrary path of the optical cross-connect switch.

However, the prior patent suggests the switch architecture considering only the cross connect of the optical wavelength unit, but does not suggest an architecture for three-dimensionally switching wavelength resources such as wavelengths, wavebands and optical fibers.

SUMMARY OF THE INVENTION

Accordingly, the present invention has been made keeping in mind the above problems occurring in the prior art, and an object of the present invention is to provide a multi-dimensional optical cross-connect switching system, which can three-dimensionally use wavelength resources by being matched with an optical transport network through the optical fiber, the waveband and the wavelength.

Another object of the present invention is to provide an optical cross-connect switching system, wherein its switching unit for each wavelength resource is constructed in such a way that two cross-connect switches are symmetrically arranged and an insertion/extraction switch is added to switch addition/dropping links between the two switches, thereby easily adapting itself to a change of the optical transport network.

In order to accomplish the above objects, the present invention provides a multidimensional optical cross-connect switching system, comprising: an optical fiber layer switching unit, constructed to be matched with an optical transport network through input and output optical fibers, for cross-connect switching the input/output optical fibers, extracting some of the input optical fibers to its upper layer, and inserting optical fibers sent from its upper layer; an optical waveband layer switching unit, constructed to be matched with the optical transport network through input and output optical wavebands, for cross-connect switching the input/ output optical wavebands, obtaining wavebands by converting the optical fibers extracted from the optical fiber layer switching unit, extracting some of the obtained wavebands from the lower layer and the input wavebands to its upper layer, inserting wavelengths sent from its upper layer, and multiplexing some of the cross-connect switched wavebands to optical fibers and sending them down to its lower layer; an optical wavelength layer switching unit, constructed to be matched with the optical transport network through input and output optical wavelengths, cross-connect switching the input/output optical wavelengths, obtaining wavelengths by converting the wavebands extracted from the optical waveband layer switching unit, extracting some of the obtained wavelengths from the lower layer and the input wavelengths to a local network, inserting wavelengths sent from the local network, and multiplexing some of the wavelengths cross-connect switched to optical wavebands and sending them to its lower layer; a first inter-layer connecting unit for interfacing the optical fiber layer switching unit with the optical waveband layer switching unit for insertion/extraction therebetween; and a second inter-layer connecting unit for interfacing the optical waveband layer switching unit with the optical wavelength layer switching unit for insertion/extraction therebetween.

BRIEF DESCRIPTION OF THE DRAWINGS

The above and other objects, features and other advantages of the present invention will be more clearly understood from the following detailed description taken in conjunction with the accompanying drawings, in which:

FIG. 9b is a graph showing a blocking characteristic of the switching unit of FIG. 9a.

DESCRIPTION OF THE PREFERRED EMBODIMENTS

Hereinafter, preferred embodiments of the present invention will be described with reference to appended drawings.

Figure 3:
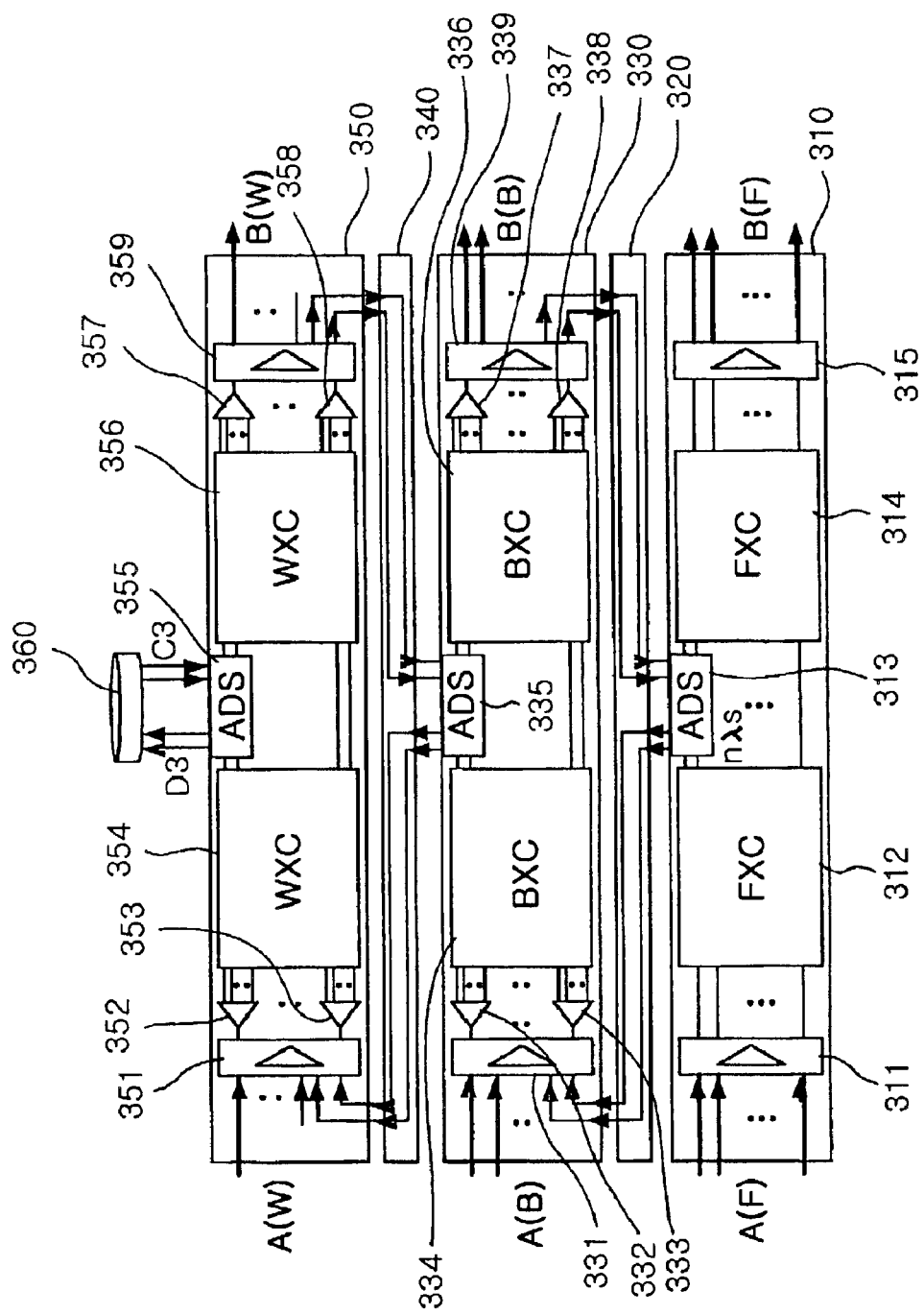
FIG. 3 is a diagram of a multi-dimensional optical cross-connect switching system of the present invention.

In FIG. 3, a construction of a multi-dimensional optical cross-connect switching system of the present invention is illustrated.

Referring to FIG. 3, the multi-dimensional optical cross-connect switching system of the present invention includes a fiber layer switching unit 310, a waveband layer switching unit 330 and a wavelength layer switching unit 350. Between the fiber layer switching unit 310 and the waveband layer switching unit 330 is positioned a first inter-layer connecting unit 320, while between the waveband layer switching unit 330 and the wavelength layer switching unit 350 is positioned a second inter-layer connecting unit 340.

The fiber layer switching unit 310 switches fibers in a cross-connect way and is matched with an optical transport network through optical fibers A(F) and output optical fibers B(F). The waveband layer switching unit 330 switches wavebands in a cross-connect way and is matched with the optical transport network through input optical wavebands A(B) and output wavebands B(B). The wavelength layer switching unit 350 switches wavelengths in a cross-connect way and is matched with the optical transport network through input optical wavelengths A(W) and output wavelengths B(W). The wavelength layer switching unit 350 is connected to a local network 360 through ports D3 and C3.

Although this embodiment describes a three-layer optical cross-connect switching system, this structure is just an example of the present invention.

In more detail, the fiber layer switching unit 310 comprises two Fiber Cross-Connect (FXC) switches 312 and 314, an insertion/extraction switch 313 connected to the two FXC switches 312 and 314 at a position therebetween, a pre-amplifier 311 connected to an input side of the FXC switch 312, and a post-amplifier connected to an output side of the FXC switch 314.

The waveband layer switching unit 330 comprises two waveBand Cross-Connect (BXC) switches 334 and 336, an insertion/extraction switch 335 connected to the two BXC switches 334 and 336 at a position therebetween, a demultiplexers 332 and 333 connected to an input side of the BXC switch 334, a pre-amplifier 311 connected to an input side of the demultiplexers 332 and 333, multiplexers 337 and 338 connected to an output side of the BXC switch 336, and a post-amplifier 339 connected to an output side of the multiplexers 337 and 338.

The wavelength layer switching unit 350 comprises two Wavelength Cross-Connect (WXC) switches 354 and 356, an insertion/extraction switch 355 connected to the two WXC switches 354 and 356 at a position therebetween, demultiplexers 352 and 353 connected to an input side of the WXC switch 354, a pre-amplifier 351 connected to an input side of the demultiplexers 352 and 353, multiplexers 357 and 358 connected to an output side of the WXC switch 356, and a post-amplifier 359 connected to an output side of the multiplexers 357 and 358.

The first inter-layer connecting unit 320 interfaces the fiber layer switching unit 310 with the waveband layer switching unit 330. More specifically, the first inter-layer connecting unit 320 is connected to the insertion/extraction switch 313 of the fiber layer switching unit 310 through the insertion port C1 and the extraction port D1. Through internal wires of the first inter-layer connecting unit 320, the insertion ports C1 are connected to an output side of the post-amplifier 339 of the waveband layer switching unit 330, and the extraction ports D1 are connected to an input side of the pre-amplifier 331 of the waveband layer switching unit 330.

The second inter-layer connecting unit 340 interfaces the waveband layer switching unit 330 with the wavelength layer switching unit 350. More specifically, the second inter-layer connecting unit 340 is connected to the insertion/extraction switch 335 of the waveband layer switching unit 330 through the insertion port C2 and the extraction port D2. Through internal wires of the second inter-layer connecting unit 340, the insertion port C2 is connected to an output side of the post-amplifier 359 of the wavelength layer switching unit 350, and the extraction port D2 is connected to an input side of the pre-amplifier 351 of the wavelength layer switching unit 350. Meanwhile, the local network 360 is connected to the insertion/extraction switch 355 of the wavelength layer switching unit 350 through the insertion port C3 and the extraction port D3.

As shown in FIG. 3, the multi-dimensional optical cross-connect switching system of the present invention comprises the three-layered switching units that can be independently matched with the optical fibers, the wavebands and the wavelengths. At each layer, the two cross-connect switches are symmetrically positioned on left and right sides in each switching unit, and the insertion/extraction switches for switching insertion/extraction/passage states are provided between the cross-connect switches.

In the above structure, the pre-amplifier amplifies the intensity of signals to a specific level so that signals, which are inputted to the multi-dimensional optical cross-connect switching system of the present invention, can be safely switched in the system. The post-amplifier amplifies the intensity of signals to a specific level so that signals from the multi-dimensional optical cross-connect switching system can be transmitted through a long distance. Each of the multiplexers multiplexes a plurality of wavelengths into fibers or wavebands, and each of demultiplexers separates the wavelengths multiplexed in the fibers or wavebands.

Next, an operation of the multi-dimensional optical cross-connect switching system constructed as above will be described.

In the fiber layer switching unit 310, a pair of FXC switches 312 and 314 perform cross-connect switching between the input optical fibers A(F) and the output optical fibers B(F). In more detail, the FXC switch 312 sends some of the input fibers A(F) to the insertion/extraction switch 313, the insertion/extraction switch 313 switches the fibers to the extraction port D1. Others of the input fibers A(F) are sent to the FXC switch 314 to be switched for the second time if necessary, and then amplified by the post-amplifier 315. The insertion/extraction switch 313 switches fibers from the FXC switch 312 to the extraction ports D1, these fibers are input to the pre-amplifier 331 of the waveband layer switching unit 330 through the first inter-layer connecting unit 320. At the same time, the insertion/extraction switch 313 receives fibers inserted through the insertion ports of the first inter-layer connecting unit 320, and switches these fibers to the FXC switch 314. The FXC switch 314 cross connects fibers received from the FXC switch 312 and fibers inserted from the insertion/extraction switch 313, and these fibers are amplified by the post-amplifier 315 to be transmitted to the optical transport network as the output fibers B(F).

In the waveband layer switching unit 330, a pair of BXC switches 334 and 336 perform cross-connect switching between the input wavebands A(B) and the output wavebands B(B). Specifically, the input wavebands A(B) are amplified by the preamplifier 331, demultiplexed by the demultiplexer 332 and inputted to the BXC switch 334. The fibers extracted from the fiber layer switching unit 310 are amplified by the preamplifier 331, demultiplexed to wavebands by the demultiplexer 333 and inputted to the BXC switch 334. The BXC switch 334 sends some of the inputted wavebands to the insertion/extraction switch 335, and the insertion/extraction switch 335 switches these wavebands to the extraction ports D2. At the same time, the insertion/extraction switch 335 receives the inserted wavebands through the insertion ports C2 and switches these fibers to the BXC switch 336. The remaining wavebands of the wavebands inputted to the BXC switch 334 are sent to the BXC switch 336. Some of wavebands sent to the BXC switch 336 are multiplexed by the multiplexer 337, amplified by the post-amplifier 339 and sent to the optical transport network as the output wavebands B(B). The remaining wavebands are multiplexed to fibers by the multiplexer 338, amplified by the post-amplifier 339 and sent to the fiber layer switching unit 310 through the first inter-layer connecting unit 320.

In the wavelength layer switching unit 350, a pair of WXC switches 354 and 356 perform cross-connect switching between the input wavelengths A(W) and the output wavelengths B(W). Specifically, the wavelength-multiplexed input wavelengths A(W) are amplified by the preamplifier 351, demultiplexed by the demultiplexer 352 and inputted to the WXC switch 354. The wavebands extracted from the wavebands layer switching unit 330 are amplified by the preamplifier 351, demultiplexed to wavelengths by the demultiplexer 353 and inputted to the WXC switch 354. The WXC switch 354 sends some of the inputted wavelengths to the insertion/extraction switch 355, and the insertion/extraction switch 355 switches these wavelengths to the extraction ports D3 and send these wavelengths to the local network 360. At the same time, the insertion/extraction switch 355 receives the inserted wavelengths of the local network 360 through the insertion ports C3, and switches these wavelengths to the WXC switch 356. The remaining wavelengths of the wavelengths inputted to the WXC switch 354 are sent to the WXC switch 356. Some of wavelengths sent to the WXC switch 356 are multiplexed by the multiplexer 357, amplified by the post-amplifier 359 and sent to the optical transport network as the output wavelengths B(W). The remaining wavelengths are multiplexed to wavelengths by the multiplexer 358, amplified by the post-amplifier 359 and sent to the waveband layer switching unit 330 through the second inter-layer connecting unit 340.

Figure 4:
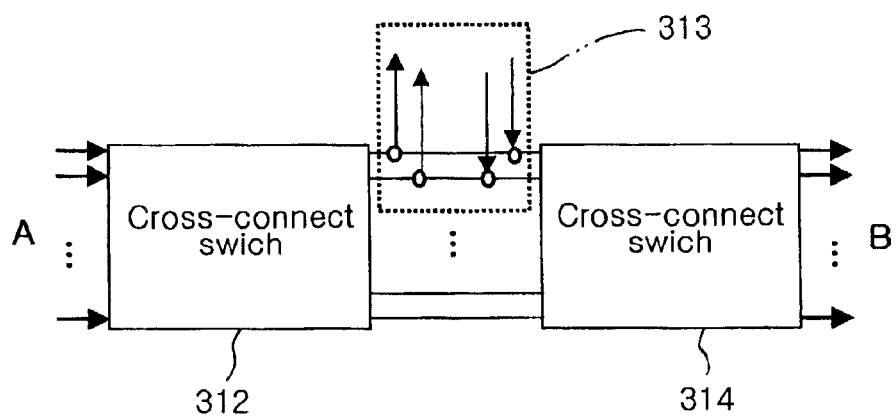
FIG. 4a is a diagram showing a connection relation between the cross-connect switches and the insertion/extraction switch of FIG. 3.
FIG. 4b is a diagram showing an inter-layer connecting unit of FIG. 3.
Figure 4:
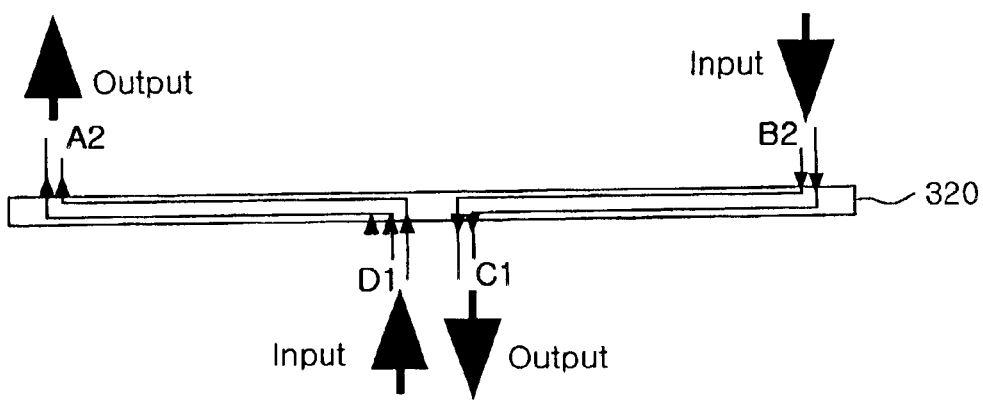

FIG. 4a shows a connection relation between the cross-connect switches 312 and 314 and the insertion/extraction switch 313 of FIG. 3. Some of the output fibers inputted from the cross-connect switch 312 are extracted to the upper layer by the switching of the insertion/extraction switch 313, and the fibers inserted from the upper layer are sent to the cross-connect switch 314 by the switching of the insertion/extraction switch 313. In addition, in each switching unit of the present invention, two cross-connect switches are symmetrically positioned at left and right sides and the insertion/extraction switch is positioned therebetween. This symmetrical structure has an advantage of changing the number of inserted/extracted links without affecting the input A and output B of the switching unit in comparison with the conventional structure consisting of a single cross-connect switch. In addition, the present invention has another advantage of automatically and dynamically changing internal configuration with the insertion/extraction switch positioned between the two cross-connect switches.

In FIG. 4b, the first inter-layer connecting unit 320 of FIG. 3 is shown. Ports A2 and B2 are indicated over the first inter-layer connecting unit 320 for convenience of explanation. The inter-layer connecting unit used in the present invention is positioned between any two of the fiber layer switching unit 310, the waveband layer switching unit 330 and the wavelength layer switching unit 350, and performs interfacing for the insertion/extraction ports between the layers. By the interfacing, the fiber layer switching unit, the waveband layer switching unit and the wavelength layer switching unit can be used individually or integratively, and, thus, the modularity of the optical cross-connect switching system is achieved. The inter-layer connecting unit is comprised of the extraction ports D1 and A2 and the insertion ports C1 and B2 that are connected to one another by internal fibers, and the number of the ports installed can be increased if necessary. Accordingly, the upper layer and the lower layer can be connected to each other through variable number of ports within the maximum number of ports.

Figure 5:
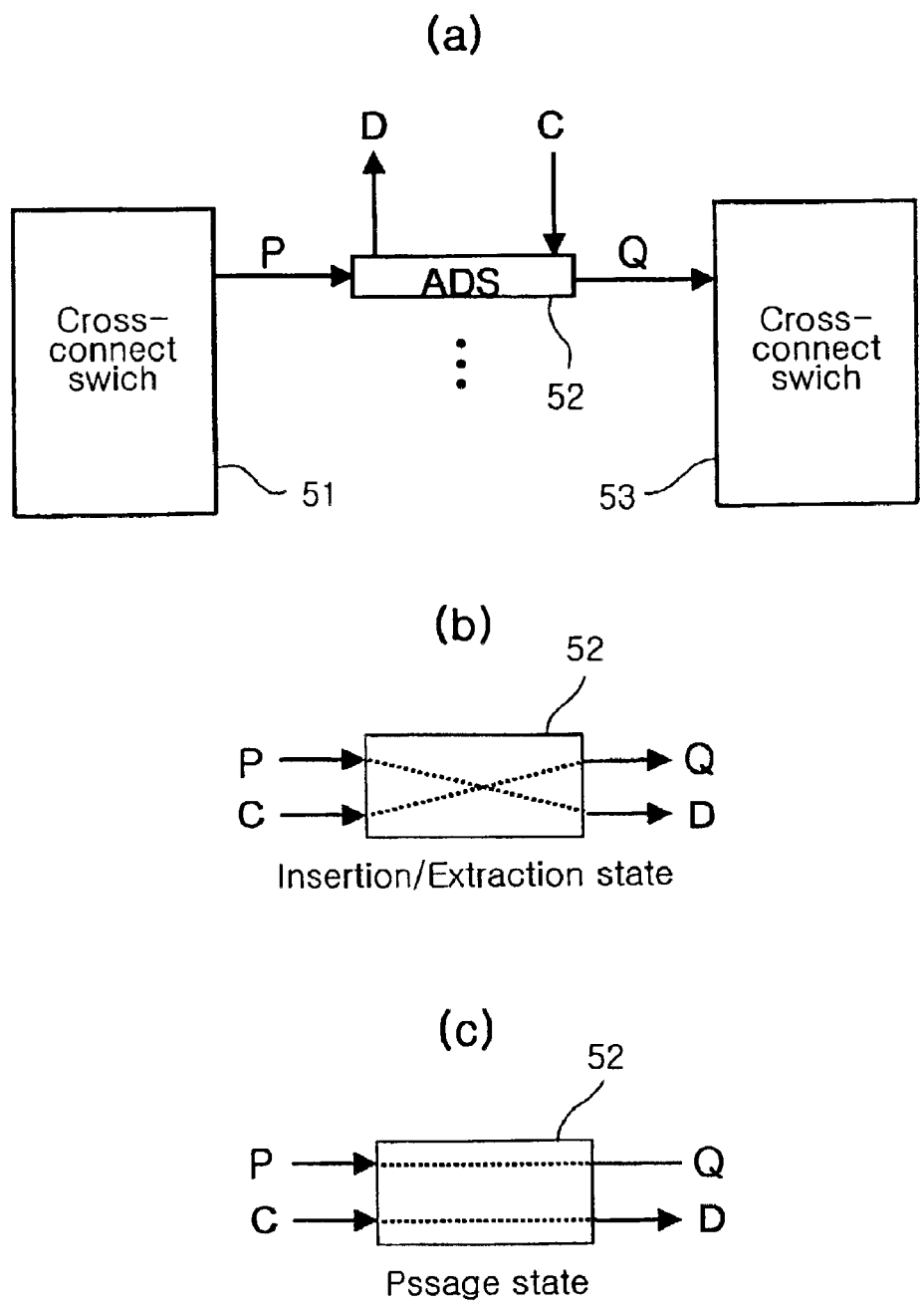
FIG. 5a is a diagram of an insertion/extraction switch applied to the present invention and used in a single optical link.
FIG. 5b and FIG. 5c are diagrams showing signal connections according to the switching states of the insertion/extraction switch.

FIGS. 5a to 5c are diagrams explaining an insertion/extraction switch inserted in a single optical link that can be applied to the present invention and the switching operation of this insertion/extraction switch.

As shown in FIG. 5a, a link P of a cross-connect switch 51 is connected to an extraction link D by the switching of the insertion/extraction switch 52. In addition, an insertion link C of an upper layer is connected to a cross-connect switch 53 through a link Q by the switching of the insertion/extraction switch 52. FIG. 5b shows an internal switching state when the insertion/extraction switch 52 is in an insertion/extraction state. That is, the ports P and D are internally connected to each other while the ports C and Q are internally connected to each other. FIG. 5c shows an internal switching state when the insertion/extraction switch 52 is in a passage state. For example, when insertion/extraction is not required, the link of the two cross-connect switches is directly connected by connecting the ports P and Q to each other. In this case, in FIG. 5c, the ports C and D may not be connected to each other.

Figure 6A:
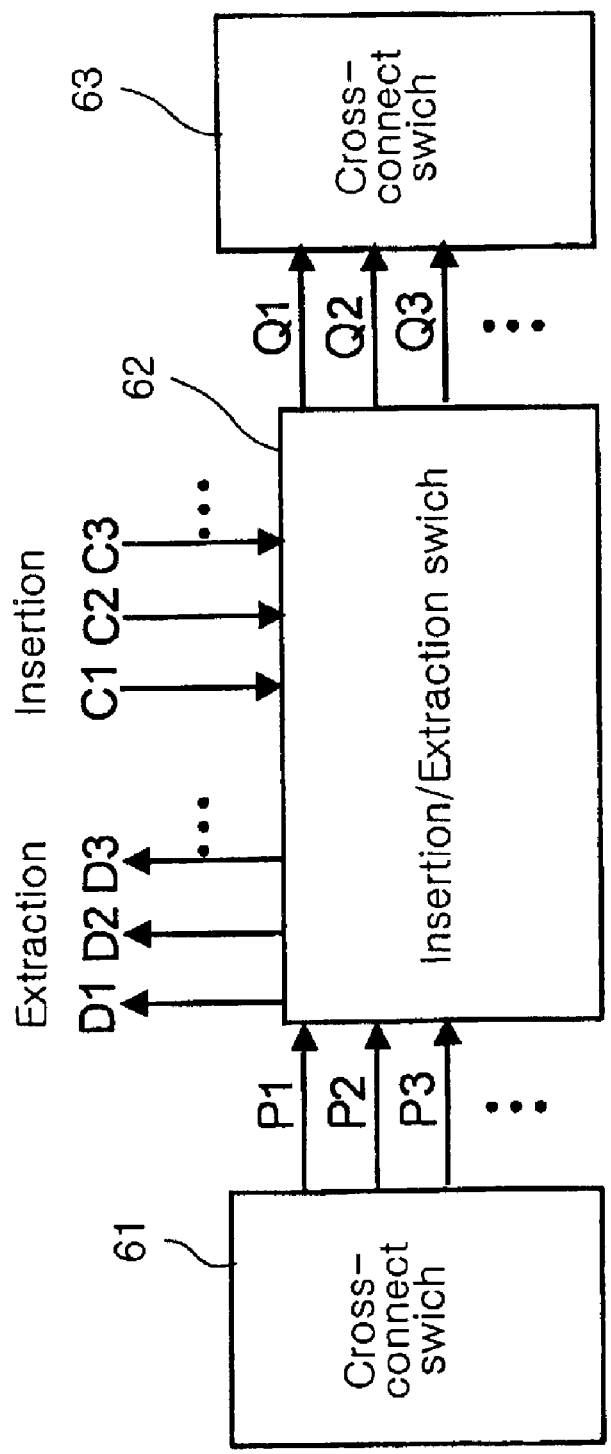
FIG. 6a is a diagram of an insertion/extraction switch applied to the present invention and used in a plurality of optical links.
Figure 6B:
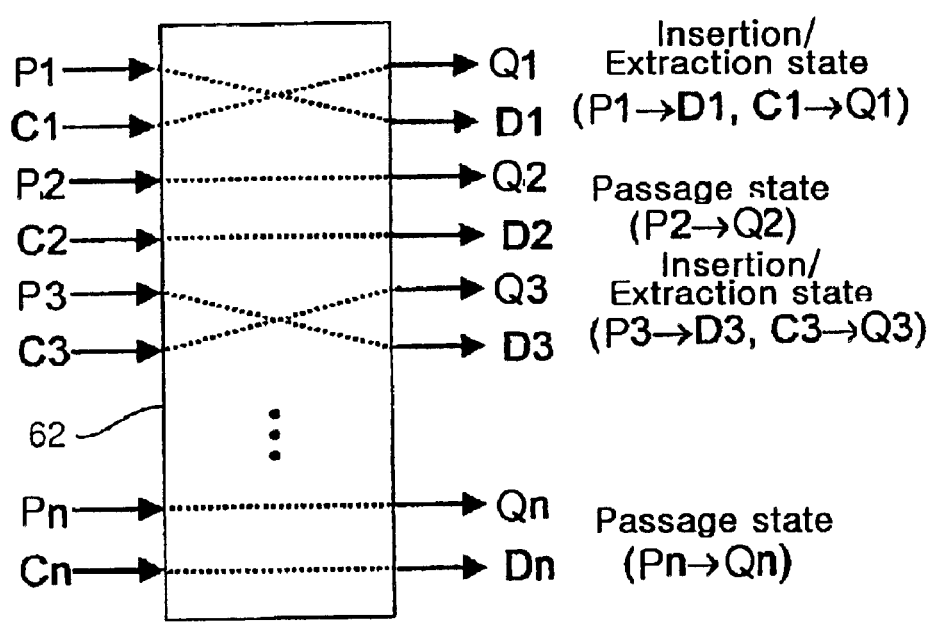
FIGS. 6b and 6c are diagrams showing an insertion/extraction switch used between aligned ports and an insertion/extraction switch used between misaligned ports, respectively.
Figure 6C:
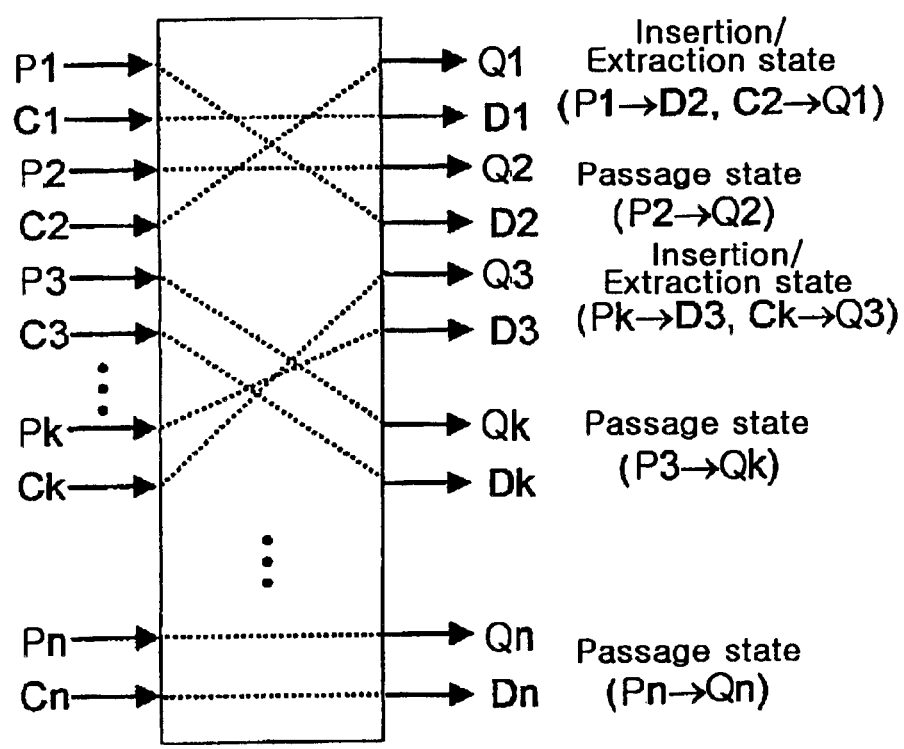

FIG. 6a shows an insertion/extraction switch matched with a plurality of optical links that can be applied to the present invention. FIGS. 6b and 6c show an insertion/extraction switch arranged between aligned ports and an insertion/extraction switch arranged between misaligned ports. As shown in FIG. 6a, by increasing the number of input/output ports of an insertion/extraction switch 62, the insertion/extraction switch 62 can be used for the insertion/extraction of a plurality of optical links.

The insertion/extraction switch 62 of FIG. 6b can be embodied as a general n×n space division switch. In the construction of FIG. 6b, the switch 62 switches its state to an insertion state, an extraction state or a passage state between the ports arranged (or fixed) horizontally. In the construction of FIG. 6c, the switch 62 switches its state to an insertion state, an extraction state or a passage state between ports arranged randomly.

Figure 7A:
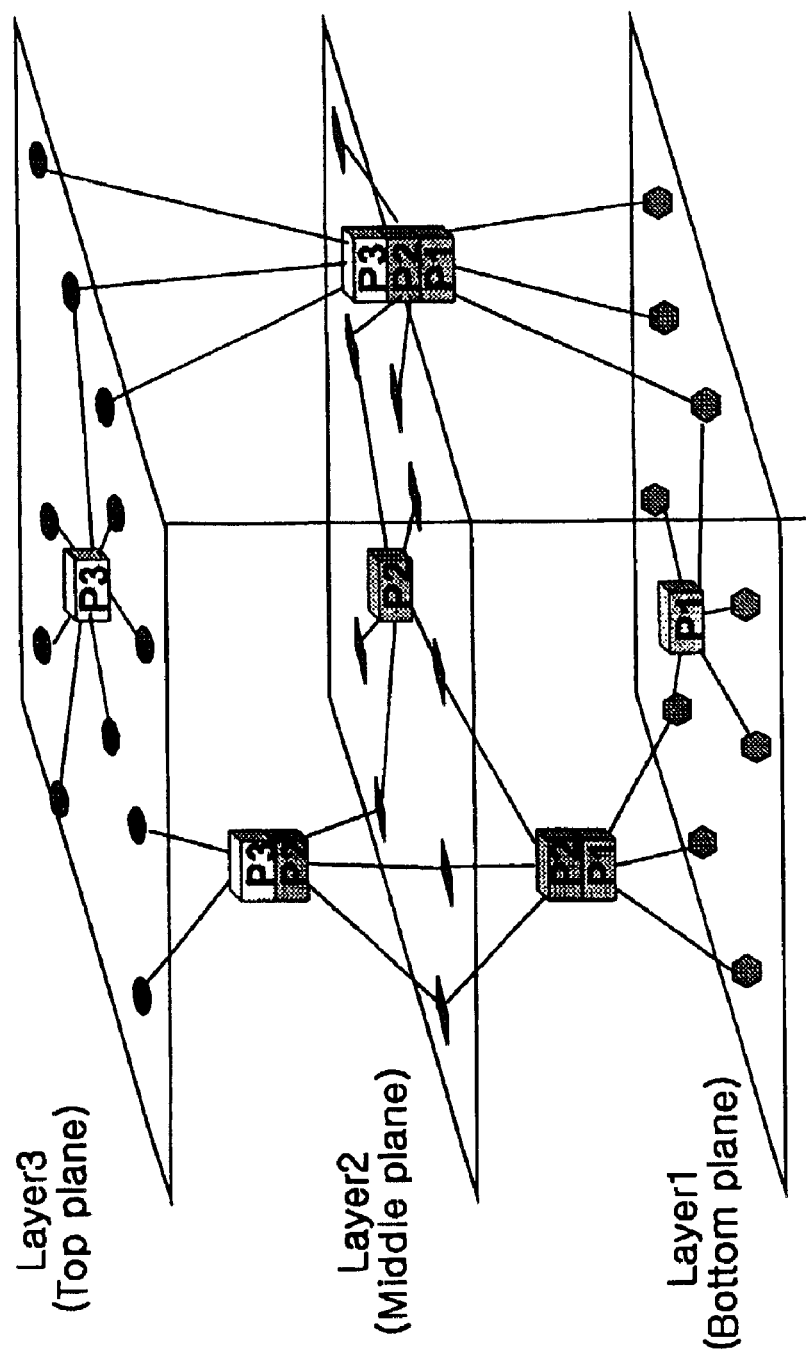
FIG. 7a is a diagram of a generalized multi-dimensional optical transport network which is envisioned for an explanation of the present invention.
Figure 7B:
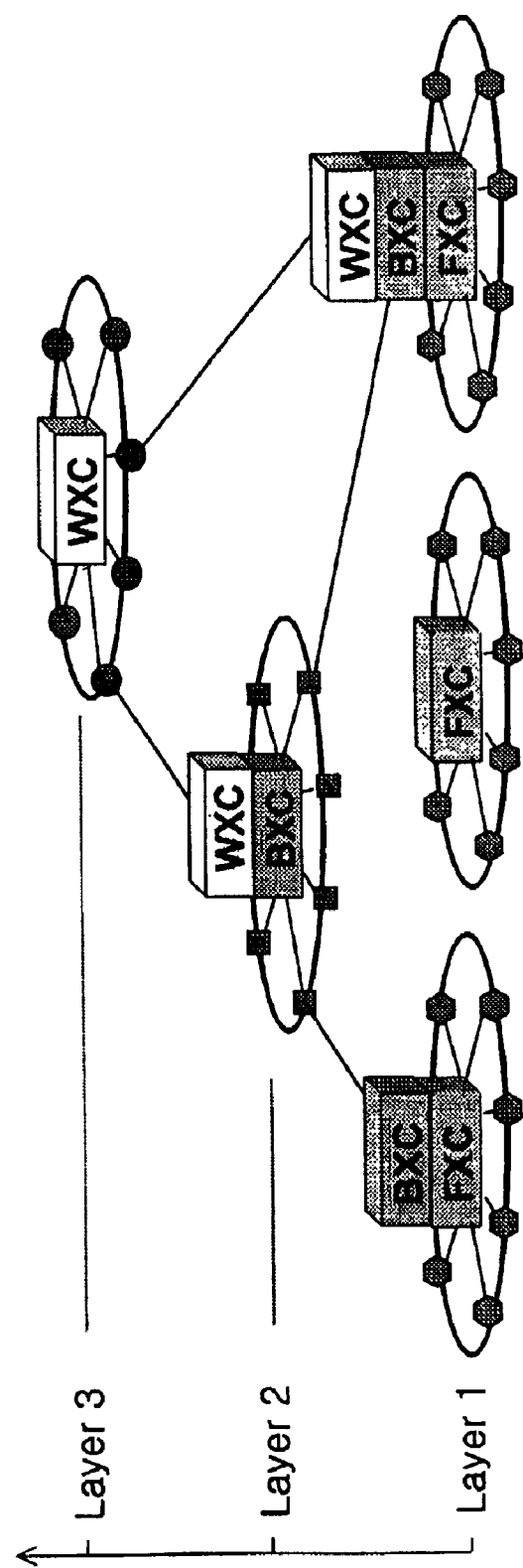
FIG. 7b is a diagram showing an optical transport network and an optical cross-connect switching system constructed in a multilayer manner according to the bandwidths of the optical waves.
Figure 7C:
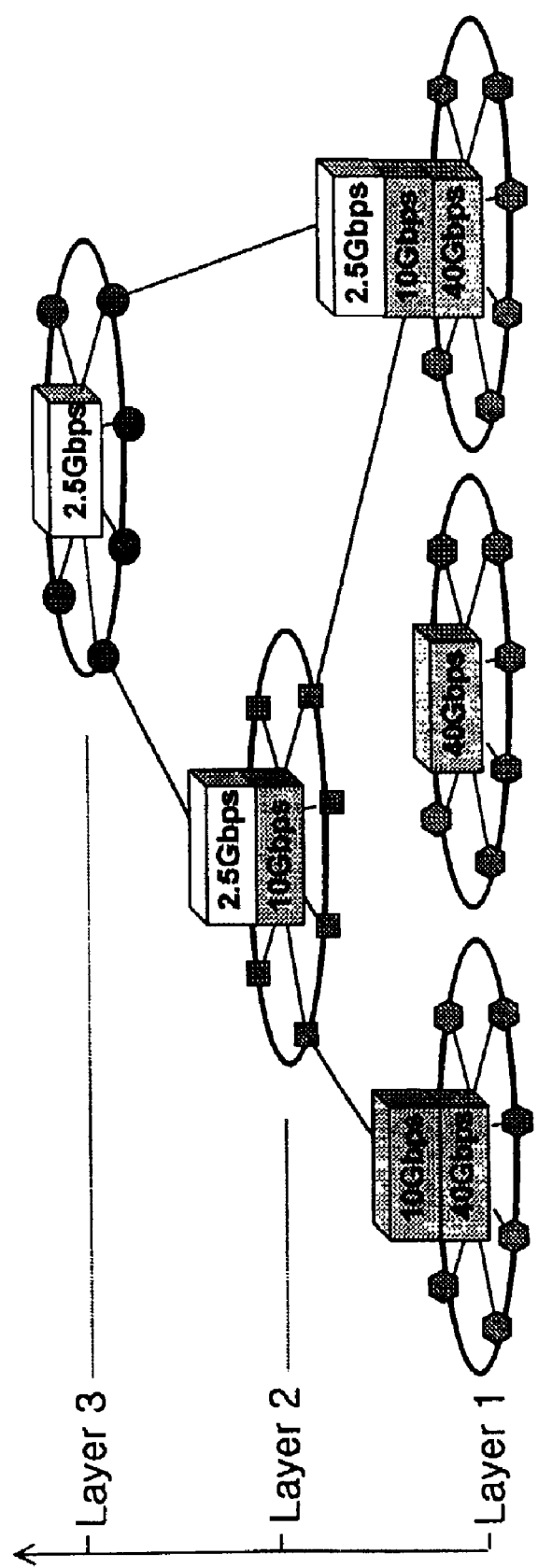
FIG. 7c is a diagram showing an optical transport network and an optical cross-connect switching system constructed in a multilayer manner according to the speeds of the links, designated specifically for an example.

As described above, the optical cross-connect switching system of the present invention can use wavelength resources such as the optical fiber, the waveband and the wavelength in a multilayer manner. FIG. 7a is a diagram showing a multidimensional structure of the optical transport network, where the optical cross-connect switching system of the present invention can be well suited for. The multidimensional optical transport network is comprised of an optical wavelength transport plane (P3), a waveband transport plane (P2), and optical fiber transport plane (P1). In the figure, P1, P2, and P3 represent transport planes 1, 2, and 3, respectively. In FIG. 7b, an example of an optical transport network, which is constructed by connecting a plurality of optical cross-connect switching systems on the basis of granularity of optical wavelength, is shown. In FIG. 7c, an example of an optical transport network, which is constructed by connecting a plurality of optical cross-connect switches on the basis of optical link speeds, is shown. In these two cases, when nodes contained in any optical transport network are connected with the wavelengths, utilizing given wavelength resources in a multilayer manner allows more connection paths to be constructed than utilizing them horizontally (i.e., one-dimensionally).

Figure 8:
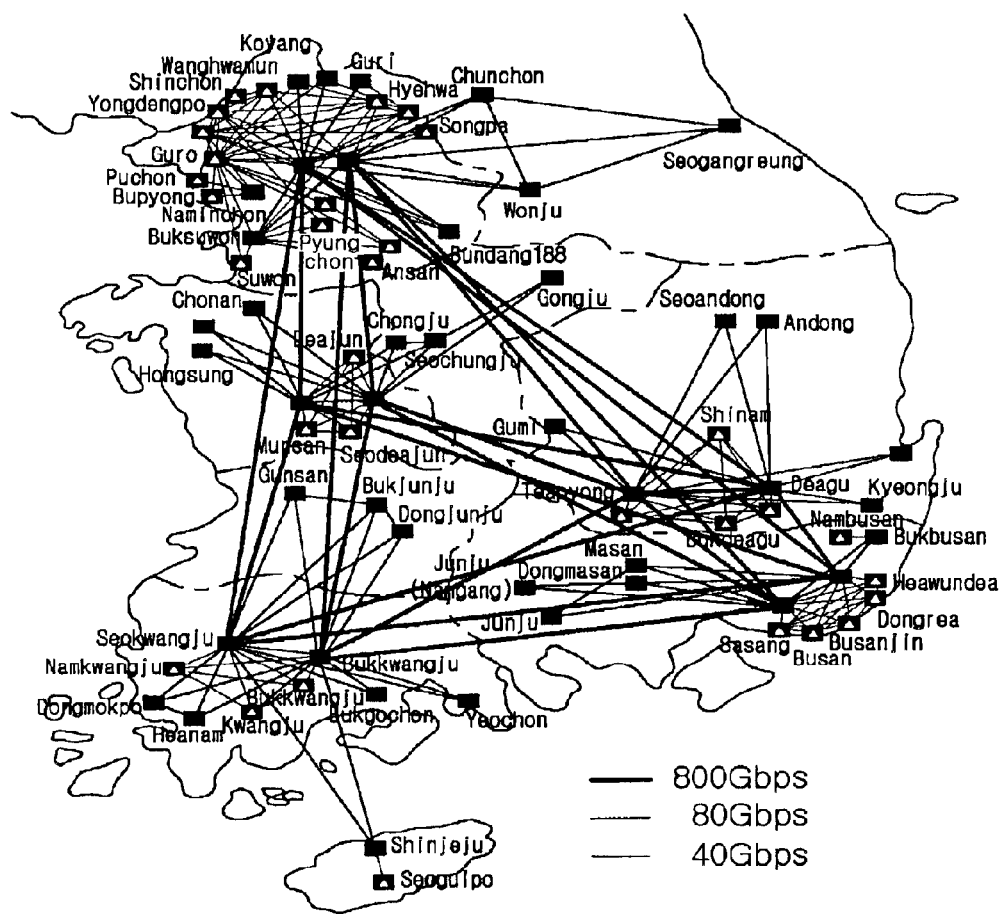
FIG. 8 is a diagram showing an example of an optical transport network in South Korea constructed using wavelength resources in a multilayer manner.

FIG. 8 shows an example in which an optical transport network is constructed by utilizing the wavelength resources in a multilayer manner. In FIG. 8, thick solid lines indicate that ten large-scale cities are connected to one another on the basis of optical fibers. In this case, it is assumed that the fibers each have 10 Gbps speed per wave and 80 waves are multiplexed. In this drawing, thin solid lines indicate that medium-scale cities are connected to one another by the waveband with 8 waves multiplexed, and dotted lines indicate that small-scale cities are connected to one another by a single wave.

In the example of the optical transport network shown in FIG. 8, "Haehwa" node requires an optical cross-connect switching system that has a three-layer complex form consisting of an optical fiber layer, a waveband layer and the wavelength layer, "Nam-Incheon" node requires an optical cross-connect switching system that has a two-layer complex form consisting of a waveband layer and a wavelength layer, and "Pyungchon" node requires an optical cross-connect switching system that has a single layer consisting of a 12×12 wavelength layer. From this example, it can be understood that the structure of the optical transport network becomes well-organized and correspondingly simplified by utilizing wavelength resources in a multilayer manner. Additionally, it can be understood that such a three-dimensional, wavelength resource-based transport network requires a complex type optical cross-connect switching system that is comprised of a combination of a fiber layer, a waveband layer and a wavelength layer.

Figure 1:
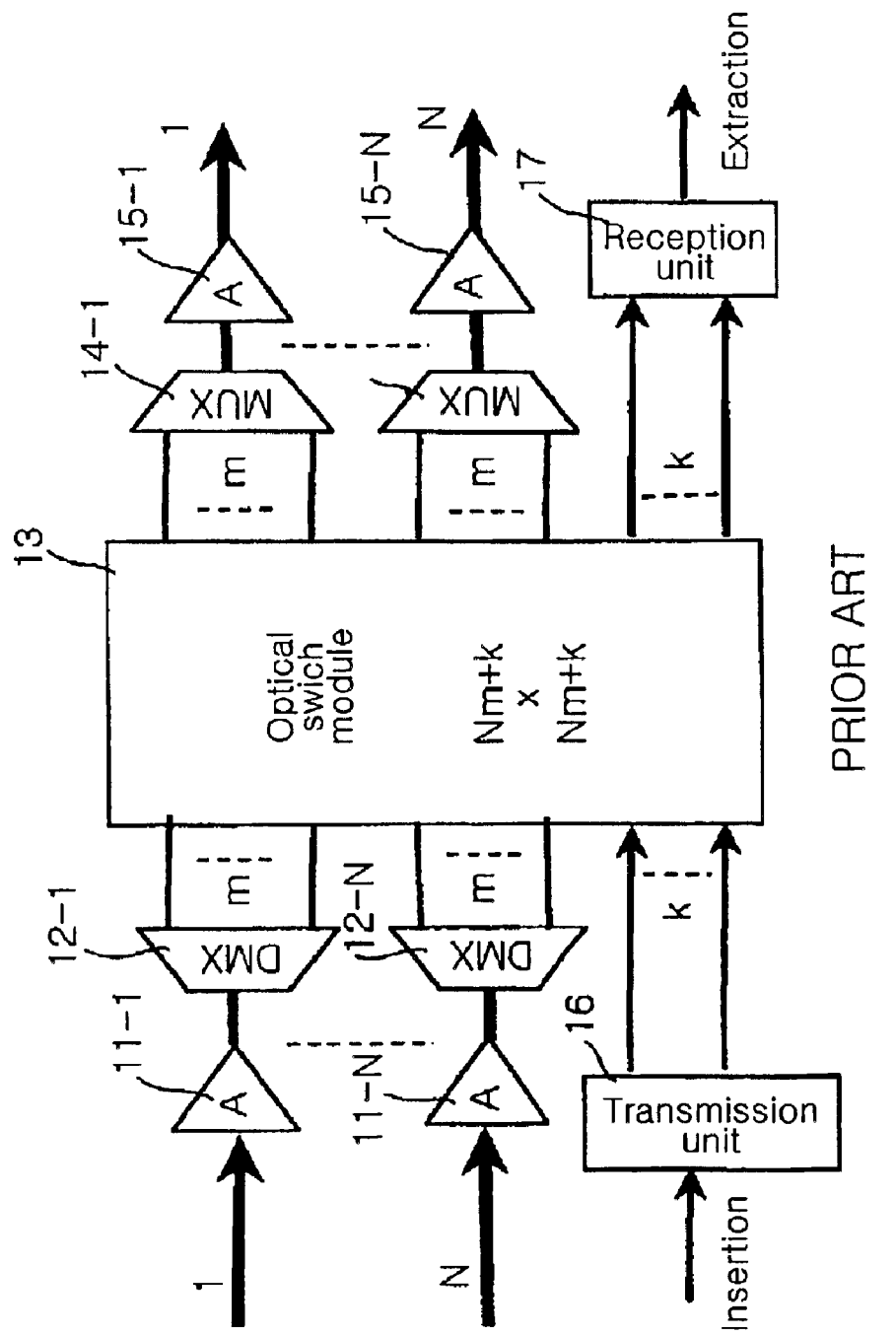
FIG. 1 is a view showing a construction of a conventional optical cross-connect switching system.
Figure 2:
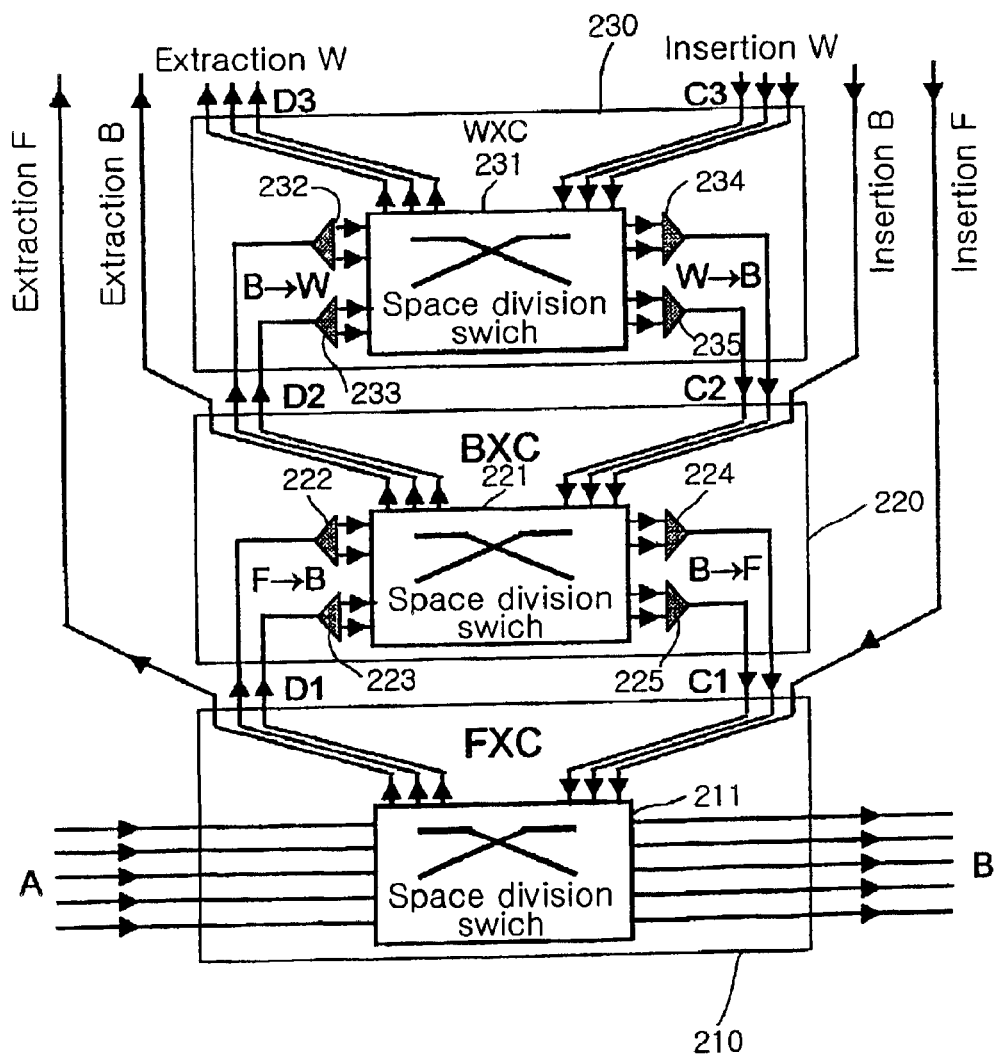
FIG. 2 is a view showing a construction of a conventional multi-granularity optical cross-connect switching system.

Next, from a point of view of loss probability analysis, insertion loss analysis, architectural features and scalability, the optical cross-connect switching system of the present invention described above and the conventional switching system shown in FIG. 2 are compared with each other and analyzed.

(Loss Probability Analysis)

Figure 9A:
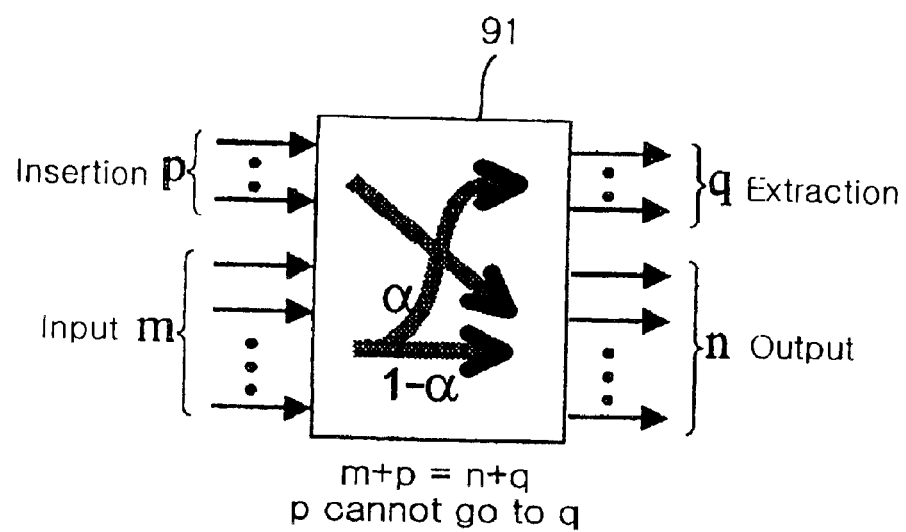
FIG. 9a is an equivalent model for analysis of a cross-connect switching unit of the switching system of FIG. 2.

In order to compare and analyze blocking characteristics, the conventional switching system shown in FIG. 2 can be equivalently represented as in FIG. 9a.

Under the following conditions, $$N=m+p=n+q, \text{ and} \quad (a)$$

$$p \text{ cannot go to } q; \quad (b)$$

blocking characteristic B is described simply as follows:

$$B=0 \text{ for } m\alpha=q=N-n \quad 1)$$

$$B=N-m\alpha-n \ (B_{max}=N-n \text{ at } \alpha=0) \text{ for } m\alpha<q \quad 2)$$

$$B=m\alpha-N+n \ (B_{max}=m-N+n \text{ at } \alpha=1) \text{ for } m\alpha>q \quad 3)$$

Figure 9B:
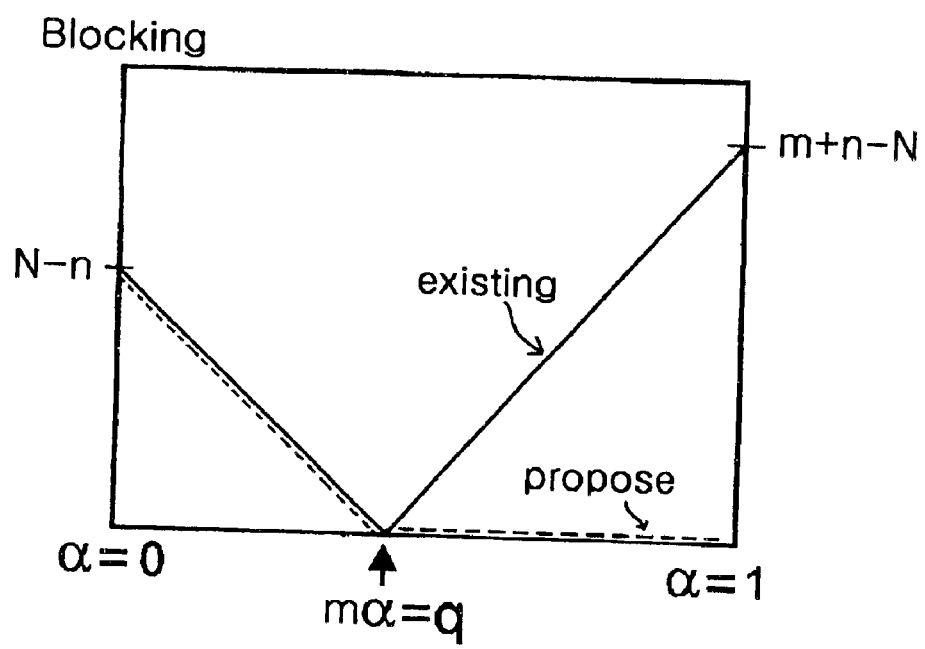

Putting the above results together, the blocking characteristic can be shown as a graph of FIG. 9b. As shown in FIG. 9b, when $m\alpha=q=N-m$, the blocking characteristic has a minimum value of zero, and blocking occurs except this point. Thus the numbers of the insertion and extraction ports should be the same, and an asymmetrical arrangement of insertion/extraction ports may cause blocking in this type of structure.

Figure 9C:
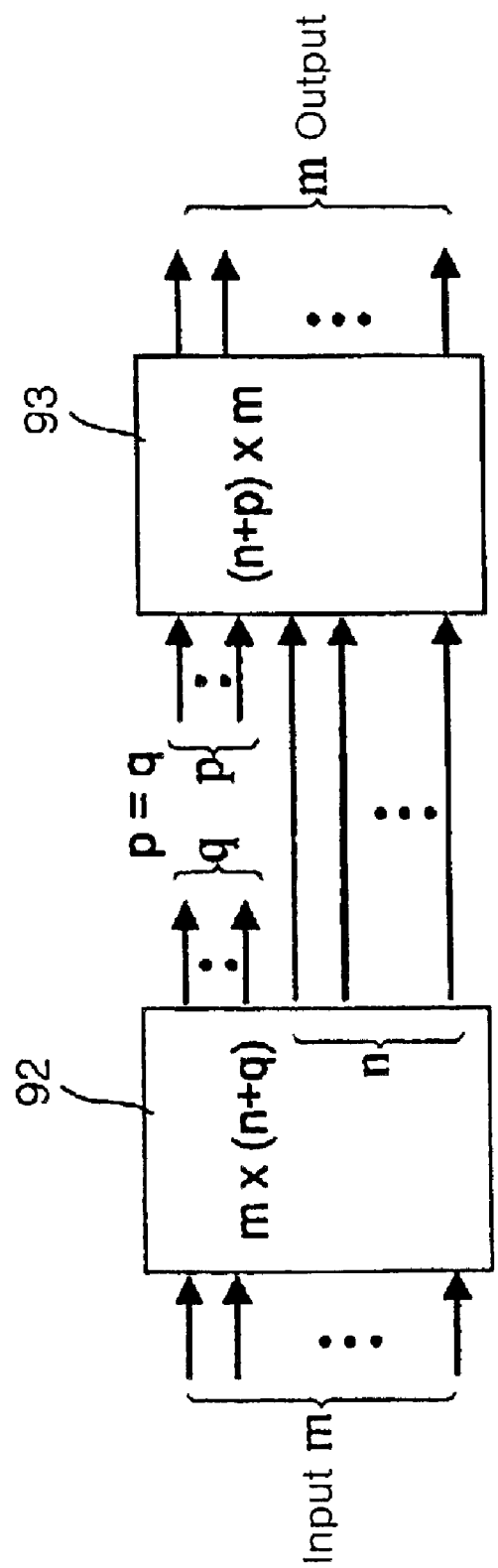
FIG. 9c is an equivalent model for analysis of a switching unit of the switching system of FIG. 3.

Meanwhile, the multi-dimensional optical cross-connect switching system of the present invention can be equivalently represented as in FIG. 9c, and its blocking characteristic is given as follows:

$$B=m\alpha-N+n \ (B_{max}=m-N+n \text{ at } \alpha=1) \text{ for } m\alpha>q$$

$$B=0 \text{ for } m\alpha \leq q$$

That is, in the switching system of the present invention, there is no blocking where $m\alpha \leq q$, unlike the conventional switching system. This result means that an asymmetrical arrangement of the insertion and extraction ports is possible with keeping non-blocking condition of $m\alpha \leq q$.

(Insertion Loss Analysis)

Before the analysis of insertion losses, insertion loss characteristics are assumed beforehand as follows: First, it is assumed for simplicity of the analysis that only the losses of the cross-connect switch, the multiplexer, the demultiplexer and the inter-layer connecting units are taken into account. The amounts of losses of elements above are assumed to be: the loss of the cross-connect switch is 2 dB, the loss of the inter-layer connecting unit is 0.5 dB, and the loss of the multiplexer and the demultiplexer is 3 dB.

Next, on the basis of this assumption, the insertion loss of the conventional switching system shown in FIG. 2 and the switching system of the present invention shown in FIG. 3 will be described.

| | Path | Loss (dB) |
|---|---|---|
| (1) | A→FXC→B | 2 |
| (2) | A→FXC→D1→BXC→C1→FXC→B | 12 |
| (3) | A→FXC→D1→BXC→D2→WXC→C2→BXC→C1→FXC→B | 24 |

2. Total insertion Loss of switching system of the present invention (in the following paths, "L-FXC" indicates a left FXC switch in FIG. 3, and "R-FXC" indicates a FXC right switch in FIG. 3)

| | Path | Loss (dB) |
|---|---|---|
| (1) | A (F)→L-FXC→R-FXC→B (B) | 4 |
| (2) | A (F)→L-FXC→D1→L-BXC→R-BXC→B (B) | 12.5 |
| (3) | A (F)→L-FXC→D1→L-BXC→R-BXC→C1→R-FXC→B (F) | 15 |
| (4) | A (F)→L-FXC→D1→L-BXC→D2→L-WXC→R-WXC→B (W) | 18 |
| (5) | A (F)→L-FXC→D1→L-BXC→D2→L-WXC→C3 | 13 |
| (6) | A (F)→L-FXC→D1→L-BXC→D2→L-QXC→R-WXC→C2→R-BXC→B (B) | 23.5 |
| (7) | A (F)→L-FXC→D1→L-BXC→D2→L-WXC→R-WXC→C2→R-BXC→C1→R-FXC→B (F) | 26 |

Summarizing the results, the maximum insertion loss in the structure of the present invention is greater than in the conventional structure by 2 dB. However, considering an amplification capability of a usual Erbium-Doped Fiber Amplifier, the total loss of 26 dB can be compensated sufficiently. That is, both of two structures can be implemented by modern amplification technology, so a loss difference of 2 dB between the two structures has little importance.

(Structural Characteristics)

The multi-dimensional optical cross-connect switching system of the present invention has a flexibility in the structural configuration to be well adapted to various types of the optical transport network, and preconditions, which the cross-connect switching system should fulfill so as to maximally utilize the wavelength resources, are satisfied as follows:

(1) The multi-dimensional optical cross-connect switching system of the present invention can easily adjust the switching functions of the FXC switch, the BXC switch and the WXC switch using the inter-layer connecting units according to requirements for the optical cross-connect switching system in the optical transport network, thereby obtaining modularity.

(2) Additionally, by automatically and dynamically controlling the number of links inserted or extracted to/from the fiber layer, the waveband layer and the wavelength layer, the multi-dimensional optical cross-connect switching system of the present invention has a high flexibility in the internal configuration change.

(3) In addition, in the multi-dimensional optical cross-connect switching system of the present invention, all of the fiber layer, the waveband layer and the wavelength layer are connected to the optical transport network, respectively.

(4) In the multi-dimensional optical cross-connect switching system of the present invention, each layer is symmetrically constructed using two cross-connect switches, so changes in internal constructions (that is, changes in extraction/insertion/passage states) occur between the output port of the left cross-connect switch and the input port of the right cross-connect switch. Accordingly, the change does not affect the input port of the left cross-connect switch and the output port of the right cross-connect switch (that is, input/output connection portions with the network).

(5) In addition, by arranging the cross-connect switches symmetrically and positioning the insertion/extraction switch between the switches to perform the automatic control of the extraction/insertion/passage states, a high flexibility for an internal configuration can be achieved to increase an ability to adapt to changes in an exterior transport network. At the same time, the modular structure in each layer accepts in a multilayer manner a configuration change in the exterior network, so that the whole structure can easily adapt to changes in the construction of the exterior network. This structural improvement is shown in an example shown in FIG. 8. More specifically, the "Haehwa"

node, e.g., the wavelength multi-dimensional optical transport network requires a three-layer cross-connect switching system consisting of a 5×5 FXC switch, a 9×9 BXC switch and a 28×28 WXC switch. Physically, 5×5, 9×9 and 28×28 space division switches are respectively required in pairs, so the optical cross-connect switching system can be constructed by using six unit switching chips through modern space division switching technology (for example, Micro Electro Mechanical Systems (MEMS) technology). However, when waves are used in the one dimension, 500×500 WXC is required. When an unblocked Clos structure is considered using 32×32 space division switches, a total of 100 unit switch chips are required for the construction. Although its effectiveness is clear by only a simple comparison of the number of the switching chips. More importantly, for the conventional one-dimensional optical transport network, as the number of nodes is increased, the complexity of the entire network structure is exponentially increased, so efforts and costs for maintaining the network are increased proportionally. Above all, as the complexity is increased, delays and errors in the signal processing are proportionally increased.

(Scalability)

Figure 10A:
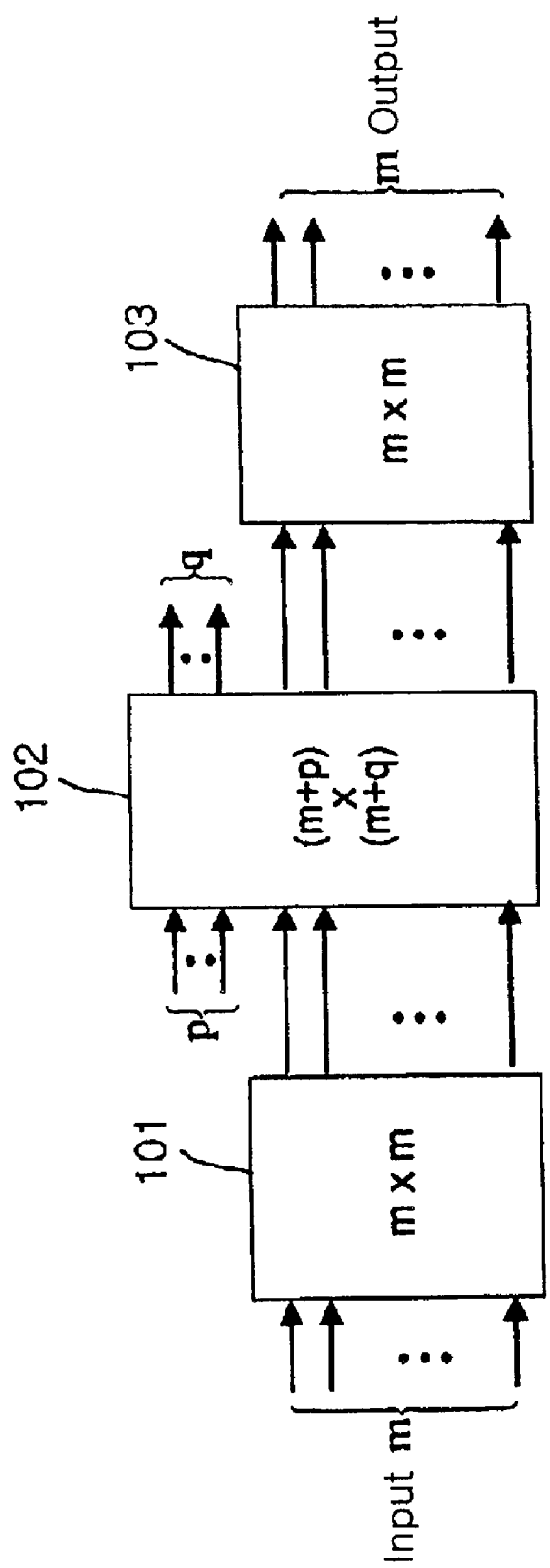
FIG. 10a is a diagram showing a layer of the optical cross-connect switching system of the present invention.
Figure 10B:
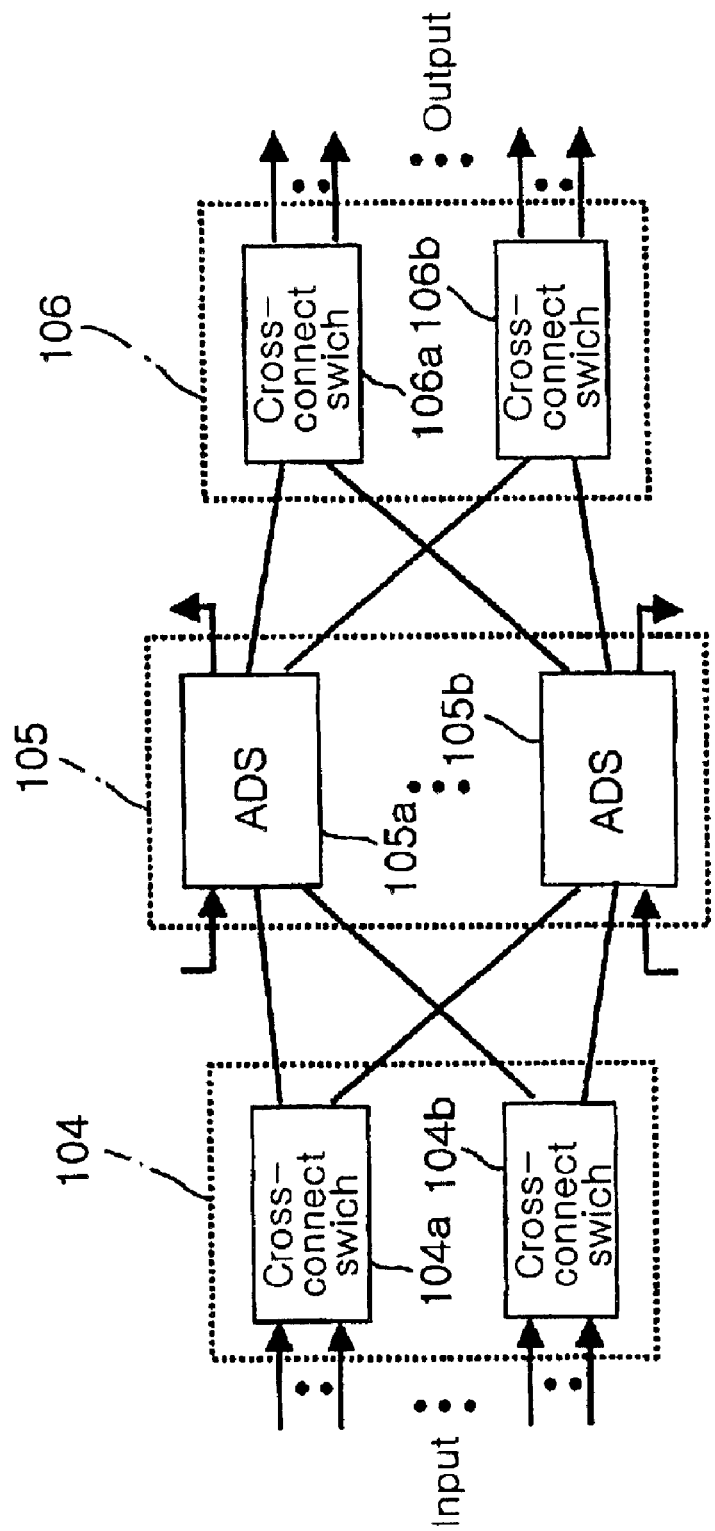
FIG. 10b is a diagram showing scalability of the switching system of the present invention.

As shown in FIG. 10a, the present invention has an advantage of obtaining various connection paths between the input/output ports of the system when the optical signal connection paths are set up or re-set up because the insertion/extraction switch is positioned between the two cross-connect switches, as well as an advantage in the blocking characteristic described above. More importantly, when the number of the input/output ports is required to be increased, as shown in FIG. 10b, this can be achieved by placing additional number of unit switches to input, output, and intermediate add/drop-switching stages, which naturally leads to forming a three-stage non-blocking Clos structure. Thus the multi-dimensional optical cross-connect switching system of the present invention has an excellent scalability.

As described above, the multi-dimensional optical cross-connect switching system of the present invention is constructed to be matched with the optical transport network through the optical fiber layer switching unit, the optical waveband layer switching unit and the optical wavelength layer switching unit and, therefore, can three-dimensionally utilize wavelength resources. In addition, in the switching system of the present invention, two cross-connect switches are symmetrically arranged and an insertion/extraction switch is positioned between two cross-connect switches, thus easily accommodating a change in links of the optical transport network.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A multidimensional optical cross-connect switching system, comprising:
   an optical fiber layer switching unit, constructed to be matched with an optical transport network through input and output optical fibers, for cross-connect switching the input/output optical fibers, extracting some of the input optical fibers to its upper layer, and inserting optical fibers sent from its upper layer;
   an optical waveband layer switching unit, constructed to be matched with the optical transport network through input and output optical wavebands, for cross-connect switching the input/output optical wavebands, obtaining wavebands by demultiplexing the optical fibers extracted from the optical fiber layer switching unit, extracting some of the wavebands from the lower layer and the input wavebands to its upper layer, inserting wavelengths sent from its upper layer, and multiplexing some of the cross-connect switched wavebands and sending them down to its lower layer;
   an optical wavelength layer switching unit, constructed to be matched with the optical transport network through input and output optical wavelengths, for cross-connect switching the input/output optical wavelengths, obtaining wavelengths by demultiplexing the wavebands extracted from the optical waveband layer switching unit, extracting some of the obtained wavelengths from the lower layer and the input wavelengths to a local network, inserting wavelengths sent from the local network, and multiplexing some of the wavelengths cross-connect switched to optical wavebands and sending them to its lower layer;
   a first inter-layer connecting unit for interfacing the optical fiber layer switching unit with the optical waveband layer switching unit for insertion/extraction therebetween; and
   a second inter-layer connecting unit for interfacing the optical waveband layer switching unit with the optical wavelength layer switching unit for insertion/extraction therebetween.

2. The multidimensional optical cross-connect switching system according to claim 1, wherein the optical fiber layer switching unit comprises:
   a first optical fiber cross-connect switch for cross-connect switching the input fibers, and extracting some of the input fibers into the upper layer and passing remaining input fibers therethrough;
   a second optical fiber cross-connect switch for cross-connect switching the optical fibers inserted from the upper layer and passed through the first optical fiber cross-connect switch, and providing them as output optical fibers; and
   an insertion/extraction switch positioned between the first and second fiber cross-connect switches for switching the optical fibers passed through the first optical fiber cross-connect switch to the first inter-layer connecting unit, and transmitting the optical fibers outputted from the first inter-layer connecting unit to the second optical fiber cross-connect switch for insertion.

3. The multidimensional optical cross-connect switching system according to claim 2, further comprising:
   a pre-amplifier positioned at an input side of the first optical fiber cross-connect switch for amplifying signal intensity of the input fibers; and
   a post-amplifier positioned at an output side of the second optical fiber cross-connect switch for amplifying signal intensity of the output fibers for long distance transmission.

4. The multidimensional optical cross-connect switching system according to claim 1, wherein the first inter-layer connecting unit comprises internal wiring fibers for insertion and extraction between the optical fiber layer switching unit and the optical waveband layer switching unit.

5. The multidimensional optical cross-connect switching system according to claim 4, wherein the internal wiring fibers of the first and second inter-layer connecting units are each comprised of one or more optical links.

6. The multidimensional optical cross-connect switching system according to claim 4, wherein the number of the internal wiring fibers of the first and second inter-layer connecting units can be changed as occasion demands.

7. The multidimensional optical cross-connect switching system according to claim 1, wherein the second inter-layer connecting unit comprises internal wiring fibers for insertion and extraction between the optical waveband layer switching unit and the optical wavelength layer switching unit.

8. The multidimensional optical cross-connect switching system according to claim 7, wherein the internal wiring fibers of the first and second inter-layer connecting units are each comprised of one or more optical links.

9. The multidimensional optical cross-connect switching system according to claim 7, wherein the number of the internal wiring fibers of the first and second inter-layer connecting units can be changed as occasion demands.

10. The multidimensional optical cross-connect switching system according to claim 1, wherein the optical waveband layer switching unit comprises:

a demultiplexer for demultiplexing the input wavebands, and demultiplexing the optical fibers extracted from the optical fiber layer switching unit into wavebands;

a first optical waveband cross-connect switch for cross-connect switching the wavebands provided by the demultiplexer, and extracting some of the wavebands to the upper layer and passing remaining wavebands therethrough;

a second optical waveband cross-connect switch for cross-connect switching and outputting the wavebands inserted from the upper layer and the wavebands passed through the first optical waveband cross-connect switch;

an insertion/extraction switch positioned between the first and second waveband cross-connect switches for sending the optical wavebands extracted from the first optical waveband cross-connect switch to the second inter-layer connecting unit, and sending the wavebands outputted from the second inter-layer connecting unit to the second optical waveband cross-connect switch for the insertion; and a multiplexer for multiplexing to the optical fibers some of the wavebands outputted from the second optical fiber cross-connect switch to be inserted into its lower layer, multiplexing remaining wavebands and providing the multiplexed waveband to the output optical fibers.

11. The multidimensional optical cross-connect switching system according to claim 10, further comprising:

a pre-amplifier positioned at an input side of the first demultiplexer for amplifying signal intensity of the input wavebands; and a post-amplifier positioned at an output side of the multiplexer for amplifying signal intensity of the output wavebands for long distance transmission.

12. The multidimensional optical cross-connect switching system according to claim 1, further comprising:

a demultiplexer for demultiplexing the input wavelengths, and demultiplexing the optical wavebands extracted from the optical waveband layer switching unit to wavelengths;

a first optical wavelength cross-connect switch for cross-connect switching the wavelengths provided by the demultiplexer, and extracting some of the wavelengths to the local network and passing remaining wavelengths therethrough;

a second optical wavelength cross-connect switch for cross-connect switching and outputting the wavebands inserted from the local network and the wavelengths passed through the first optical wavelength cross-connect switch;

an insertion/extraction switch positioned between the first and second wavelength cross-connect switches for sending optical wavelengths extracted from the first optical wavelength cross-connect switch to the local network, and transmitting wavelengths outputted from the local network to the second optical wavelength cross-connect switch for the insertion; and a multiplexer for multiplexing to optical wavebands some of optical wavelengths having outputted from the second optical wavelength cross-connect switch and to be inserted to the lower layer, and multiplexing remaining wavelengths and providing them to the output fibers.

13. The multidimensional optical cross-connect switching system according to claim 12, further comprising:

a pre-amplifier positioned at an input side of the first demultiplexer for amplifying signal intensity of the input wavelengths; and a post-amplifier positioned at an output side of the multiplexer for amplifying signal intensity of the output wavelengths for long distance transmission.

* * * * *